United States Patent [19]
Iwamoto

[11] Patent Number: 5,768,010
[45] Date of Patent: Jun. 16, 1998

[54] ACOUSTO-OPTIC SCANNING DEVICE

[75] Inventor: Tsuyoshi Iwamoto, Kyoto, Japan

[73] Assignee: Minolta Co., Ltd., Osaka, Japan

[21] Appl. No.: 697,599

[22] Filed: Aug. 27, 1996

[30] Foreign Application Priority Data

Aug. 28, 1995 [JP] Japan ................................. 7-219085

[51] Int. Cl.$^6$ ............................................. G02F 1/33
[52] U.S. Cl. ........................... 359/311; 359/315; 359/318; 359/289
[58] Field of Search ............................. 359/311, 315, 359/318, 289

[56] References Cited

U.S. PATENT DOCUMENTS

| | | | |
|---|---|---|---|
| 4,696,551 | 9/1987 | Amano et al. | 359/311 |
| 4,798,449 | 1/1989 | Vichon et al. | 359/311 |
| 5,576,880 | 11/1996 | Chang | 359/311 |

FOREIGN PATENT DOCUMENTS 57-142623  9/1982  Japan.
61-023377  1/1986  Japan.

*Primary Examiner*—Frank G. Font
*Assistant Examiner*—Reginald A. Ratliff
*Attorney, Agent, or Firm*—Burns, Doane, Swecker & Mathis, LLP

[57] ABSTRACT

The disclosed acousto-optic scanning device includes a thin film waveguide of piezoelectric material (2), a transducer (3) for generating surface elastic waves, and a high frequency signal generator (4) for generating high frequency signals to be applied to the transducer. Additionally, the device includes a light source (10), light source driver (11) for driving the light source, a prism or grating input and output light couplers (7, 8 or 27, 28) for introducing light emitted from the light source into the thin film waveguide and for outputting light transmitted through the thin film waveguide therefrom. Further, the device includes non-coupled light photodiode detector array (14) for detecting the position and intensity of light which is not coupled by the output light coupling means, and a signal processor for processing information detected by the non-coupled light detector array and generating control signals to correct the position and intensity of coupled light.

20 Claims, 2 Drawing Sheets

ACOUSTO-OPTIC SCANNING DEVICE

BACKGROUND OF THE INVENTION

1. Field of the Invention

The present invention relates to an acousto-optic scanning device, and more specifically relates to an acousto-optic scanning device using a thin film waveguide.

2. Description of the Related Art

Various optical scanning devices have been proposed which use well known technology to deflect the light passing through a thin film waveguide by using the interactions (Bragg diffraction) of acousto-optics and surface elastic waves propagated in a thin film waveguide.

Conventional devices comprise a thin film waveguide of a piezoelectric material, a transducer for generating surface elastic waves, a light source, light source driving means for driving the light source, high frequency signal generating means for generating high frequency signals applied to the transducer, input light coupling means for introducing light from a light source to the thin film waveguide, and a light output coupling means for outputting light transmitted through the thin film waveguide from the waveguide. The deflection angle of light transmitted through the thin film waveguide can be controlled at high speed by changing the wavelength of the surface elastic waves propagated through the thin film waveguide by changing the frequency of the high frequency signals applied to the transducer. Consequently, the light spot on a scanned surface can scan at high speed.

In conventional optical scanning devices, however, there are disadvantages of fluctuation of position and intensity of the output light on the scanned surface. Positional fluctuation of the device output light has three main causes described below.

(1) When a laser diode or the like is used as a light source, the wavelength of the light source output light fluctuates due to changes of environmental temperature and the like, thereby causing changes in the Bragg angle of acousto-optic interaction and consequently generates errors of position of the device output light on the scanned surface.

(2) When a voltage control oscillator (VCO) is used as the high frequency signal generating means, the oscillating frequency of the high frequency signal generating means fluctuates due to changes of environmental temperature and the like, thereby causing changes in the wavelength of the surface elastic waves and changes of the Bragg angle. Consequently, the fluctuating oscillating frequency generates errors of position of the device output light on the scanned surface.

(3) Changes of environmental temperature and the like induce fluctuation of the temperature of the thin film waveguide and changes in the sonic velocity of the surface elastic waves propagated in the thin film waveguide, the wavelength of the surface elastic waves fluctuate, thereby causing changes of the Bragg angle and consequently generates errors of position of the device output light on the scanned surface.

There are two further main reasons for the fluctuation of the intensity of the device output light.

(4) Light source output light intensity fluctuates due to changes of environmental temperature and the like, and consequently generates errors of position of the device output light on the scanned surface.

(5) The high frequency signal output of the high frequency signal generating means fluctuates due to changes of environmental temperature and the like, which produces changes of the Bragg diffraction efficiency and consequently generates errors of intensity of the device output light on the scanned surface.

Conventional measures of dealing with positional fluctuation of the device output light include a device disclosed in Japanese Unexamined Patent Application No. SHO 57-142623 which provides means for observing the sonic velocity of the surface elastic waves, and accomplishes positional correction using the feedback of the sonic velocity information. This device, however, requires the provision of a separate opposing electrode to detect the surface elastic waves, which produces new disadvantages inasmuch as production efficiency is reduced and the size of the device is enlarged.

Measures of dealing with intensity fluctuation of the device output light include a device disclosed in Japanese Unexamined Patent Application No. SHO 61-23377 which provides a lens on the waveguide to observe the intensity of part of the guided ray, and accomplishes intensity correction based on the feedback of the detected intensity information. This device, however, has a complex construction which makes it difficult to achieve suitable positioning of the various components. The measures taken in both cases require separate dedicated correction systems to correct the position and intensity of the device output light, and are inefficient from the perspectives of device compactness and cost.

SUMMARY

An object of the present invention is to eliminate the previously described disadvantages.

Another object of the present invention is to provide an acousto-optic scanning device that corrects intensity fluctuation and positional fluctuation of device output light via a simple construction.

A further object of the present invention is to provide a high precision, compact, and inexpensive acousto-optic scanning device that corrects intensity fluctuation and positional fluctuation of device output light via a simple construction.

A still further object of the present invention is to provide an acousto-optic scanning device that corrects fluctuation-induced errors caused by intensity fluctuation and positional fluctuation of device output light via a simple construction by obtaining position and intensity information of device output light and using this information as feedback to accomplish the correction.

These and other objects are attained by providing an acousto-optic scanning device comprising a thin film waveguide of piezoelectric material, a transducer for generating surface elastic waves, high frequency signal generating means for generating high frequency signals to be applied to the transducer, a light source, light source driving means for driving the light source, input light coupling means for introducing light emitted from the light source into the thin film waveguide, output light coupling means for outputting light transmitted through the thin film waveguide therefrom, non-coupled light detecting means for detecting the position and intensity of light which is not coupled by the output light coupling means, and signal processing means for processing information detected by the non-coupled light detection means and generating control signals to correct the position and intensity of coupled light.

The aforesaid objects are further achieved by providing an acousto-optic scanning device comprising a thin film waveguide of piezoelectric material, a transducer for generating surface elastic waves, high frequency signal generating means for generating high frequency signals to be applied to the transducer, a light source, light source driving means for driving the light source, input light coupling means for introducing light emitted from the light source into the thin film waveguide, output light coupling means for outputting light transmitted through the thin film waveguide therefrom; and wherein the output light coupling means emits coupled light and non-coupled light; non-coupled light detecting means for detecting the position and intensity of non-coupled light emitted by the output light coupling means, signal processing means for generating control signals to correct the position and intensity of coupled light based on the detection result of the non-coupled light detecting means, first control means for modifying light intensity by controlling the light source driving means based on control signals, and second control means for modifying signal output and oscillation frequency by controlling the high frequency signal generating means based on control signals.

BRIEF DESCRIPTION OF THE DRAWINGS

These and other objects and features of the present invention will become apparent from the following description of the preferred embodiments thereof taken in conjunction with the accompanying drawings, in which.

In the following description, like parts are designated by like reference numbers throughout the several drawings.

DETAILED DESCRIPTION

The preferred embodiments of the acousto-optic scanning device of the present invention are described hereinafter with reference to the accompanying drawings.

Figure 1:
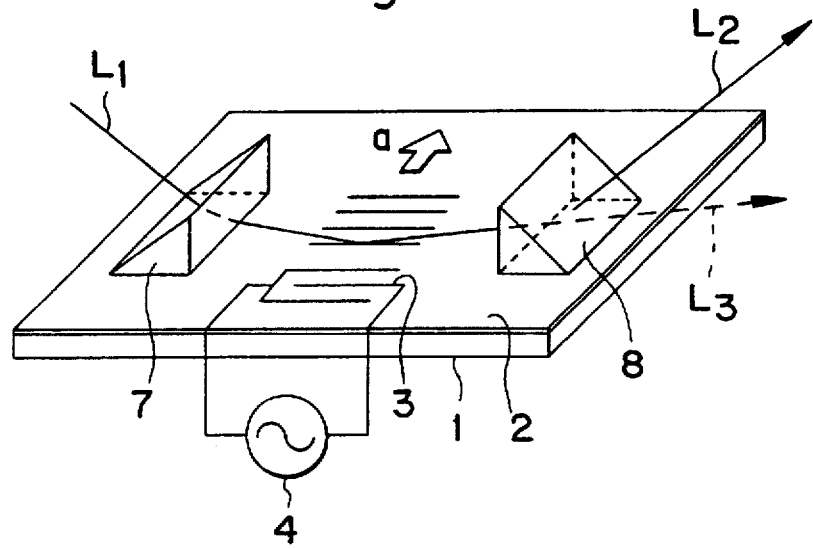
FIG. 1 is a perspective view showing a first embodiment of an acousto-optic scanning device of the present invention.
Figure 2:
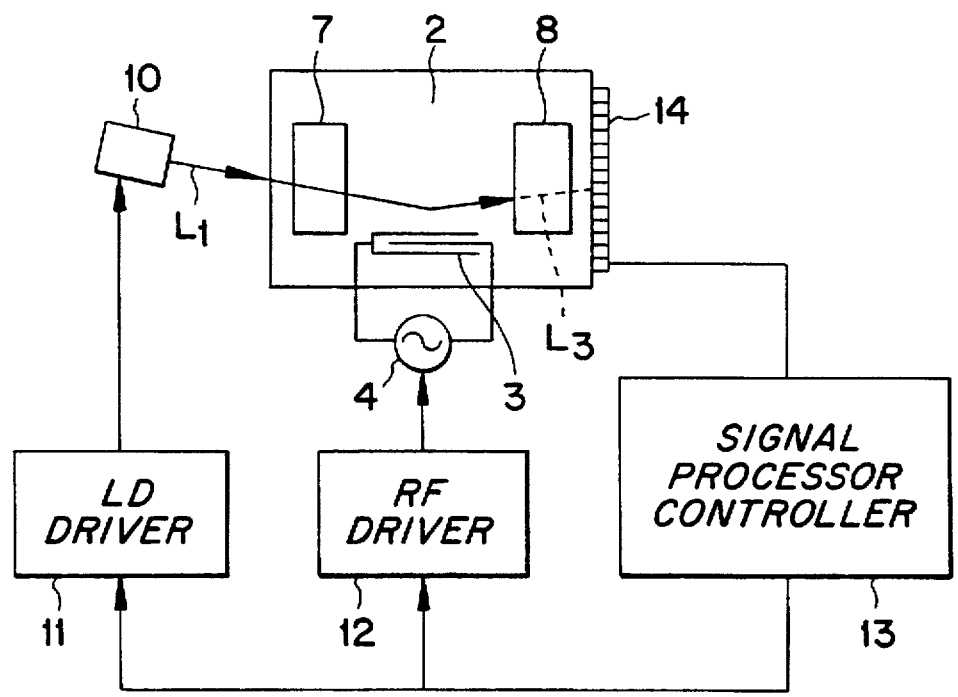
FIG. 2 is an electrical circuit diagram of the first embodiment.

First Embodiment (FIGS. 1 and 2)

The acousto-optic scanning device of the first embodiment uses prism couplers as the input light coupling means and output light coupling means. As shown in FIGS. 1 and 2, the optical scanning device comprises a substrate 1, a thin film waveguide 2 formed on the substrate 1, a transducer 3, signal generating means 4, an input prism coupler 7 and an output prism coupler 8, a laser diode 10, a laser diode driver 11, a radio frequency (RF) driver 12, a signal processor controller 13, and a photodiode array 14.

The thin film waveguide 2 is formed of piezoelectric material such as, for example, $LiNbO_3$, $Li_2B_4O_7$, $LiTa_2O_5$ or the like. The thin film waveguide 2 is formed on the aforesaid substrate 1 by means such as laser ablation, spattering, CVD or the like. The transducer 3 is arranged anterior to the center section of the thin film waveguide 2 and uses a interdigital electrode. The transducer 3 excites surface elastic waves in the thin film waveguide 2 when high frequency signals generated by signal generating means 4 are applied to transducer 3. The signal generating means 4 uses, for example, a voltage control oscillator (VCO) or the like.

Input and output prism couplers 7 and 8 are arranged either side of thin film waveguide 2. The input prism coupler 7 introduces the laser light emitted from the laser diode 10 into the thin film waveguide 2. The output prism coupler 8 emits the laser light transmitted through the thin film waveguide 2 from the waveguide 2. The prism couplers 7 and 8 have characteristics which maintain a constant ratio between coupled light L2 intensity and non-coupled light L3 intensity regardless of changes of environmental temperature.

The photodiode array 14 is arranged at the endface of the thin film waveguide 2 on the output prism coupler 8 side. The photodiode array 14 detects the position and intensity of the non-coupled light L3 emitted from the output prism coupler 8.

The operating efficiency of the optical scanning device of the aforesaid construction is described below.

Laser light L1 having a predetermined frequency and intensity is emitted from the laser diode 10 and introduced into the thin film waveguide 2 via the input prism coupler 7. On the other hand, when high frequency signals of a standard frequency f are generated by the signal generating means 4 and applied to the transducer 3, surface elastic waves of a wavelength $\lambda$ (where $\lambda = v/f$; and v is the sonic velocity) are excited in the thin film waveguide 2. These excited surface elastic waves are propagated in the [arrow a] direction of the arrow a shown in FIG. 1 (perpendicular to the laser light propagation direction).

The input light L1 is subject to a Bragg diffraction phenomenon as a result of interaction with the surface elastic waves at about a 90° angle relative to the direction of propagation of the surface elastic waves. After the input light L1 is deflected by Bragg angle θ 1 at a diffraction efficiency n1, it is introduced into the output prism coupler 8. A major part of input light L1 is emitted from the waveguide 2 through the output prism coupler 8 as device output light. The remaining part of the input light L1, however, is emitted from the right side endface of the thin film waveguide 2 as non-coupled light L3, and enters the photodiode array 14. The intensity and position of coupled light L2 have correlative relationships with the intensity and position of non-coupled light L3. Accordingly, if information on the intensity and position of non-coupled light L3 can be obtained, this information is equivalent to obtaining information of the intensity and position of the coupled light L2.

When the Bragg angle θ1 and diffraction efficiency n1 fluctuate to θ2 and n2, respectively, due to changes of the environmental temperature and the like, the intensity and position of coupled light L2 and non-coupled light L3 also fluctuate. The fluctuations of intensity and position of non-coupled light L3 are detected by the photodiode array 14, and the detected information is transmitted to the processor controller 13. Data relating to the correlation between the intensity and position of non-coupled light L3 and the intensity and position of coupled light L2 are stored beforehand in the signal processor controller 13. Therefore, the amount of fluctuation of intensity and position of the coupled light L2 (device output light) can be determined by processing the aforesaid transmitted information. Control signals are transmitted to the laser diode driver 11 or the RF driver 12 based on the amount of fluctuation. The drivers 11 and 12 correct the intensity of the laser light L1 emitted from the laser diode 10 and correct the output and oscillation frequency of the high frequency signal generated by the signal generator 4 based on the aforesaid control signals, so as to emit device output light of desired position and intensity.

Consequently, acousto-optic scanning device can be obtained which corrects fluctuation-induced errors caused by intensity fluctuation and positional fluctuation of device output light via a compact, inexpensive, and simple construction by obtaining position and intensity information of device output light and using said information as feedback to accomplish said correction.

Figure 3:
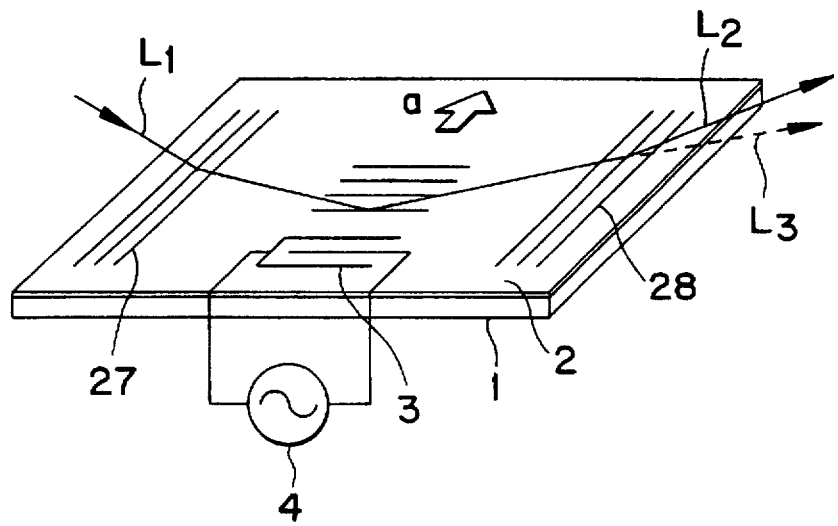
FIG. 3 is a perspective view showing a second embodiment of an acousto-optic scanning device of the present invention.
Figure 4:
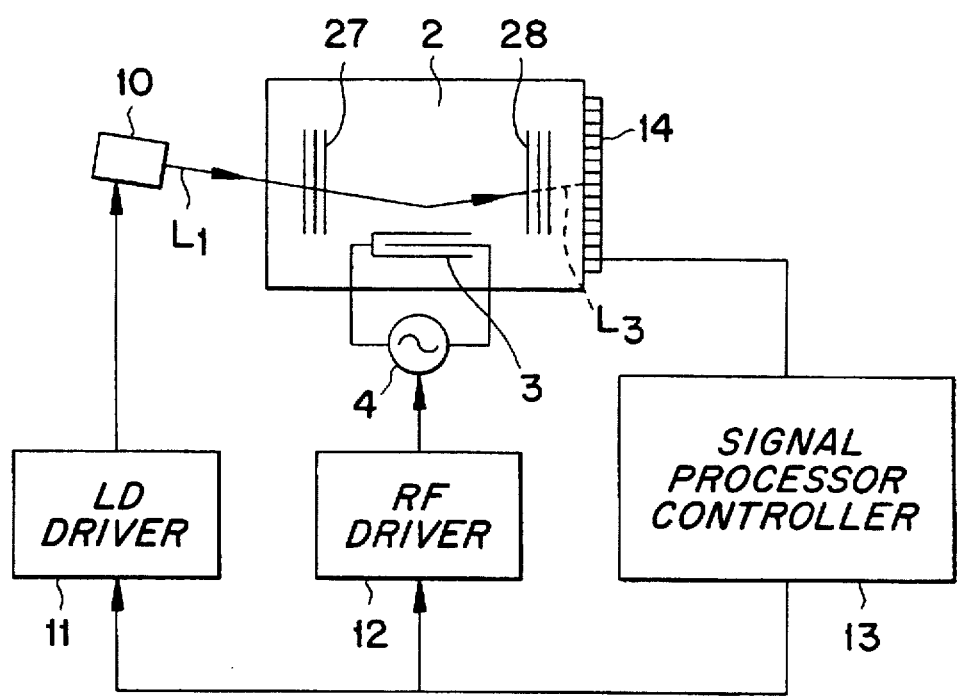
FIG. 4 is an electrical circuit diagram of the second embodiment.

Second Embodiment (FIGS. 3 and 4)

The acousto-optic scanning device of the second embodiment shown in FIGS. 3 and 4 has a construction identical to the device of the previously described first embodiment with the exception that grating couplers 27 and 28 are used as the input light coupling means and output light coupling means, and the laser diode 10 and signal generating means 4 have output stabilization circuits. Therefore, detailed description relating to the construction which are identical to that of the first embodiment are omitted.

Input and output grating couplers 27 and 28 are arranged on either side of a thin film waveguide 2. The input grating coupler 27 is used to introduce the laser light emitted from laser diode 10 into the thin film waveguide 2. The output grating coupler 28 emits the laser light transmitted through the thin film waveguide 2 from the device. The grating couplers 27 and 28 change coupling efficiency when the environmental temperature fluctuates. That is, the grating couplers 27 and 28 have the following characteristics. When the coupling efficiency is increased, the intensity of the coupled light L2 increases whereas the intensity of the non-coupled light L3 decreases. Conversely, when the coupling efficiency is decreased, the intensity of the coupled light L2 decreases whereas the intensity of the non-coupled light L3 increases.

The operating efficiency of the optical scanning device of the aforesaid construction is described below.

The laser light L1 having a predetermined frequency and intensity is emitted from the laser diode 10 and introduced into the thin film waveguide 2 via the input grating coupler 27. On the other hand, when high frequency signals of a standard frequency f are generated by the signal generating means 4 and applied to the transducer 3, surface elastic waves of a wavelength $\lambda$ (where $\lambda = v/f$; and v is the sonic velocity) are excited in the thin film waveguide 2. These excited surface elastic waves are propagated in the direction of the arrow a shown in FIG. 3 (perpendicular to the last light propagation direction).

The input light L1 is subject to a Bragg diffraction phenomenon as a result of interaction with the surface elastic waves at about a 90° angle relative to the direction of propagation of the surface elastic waves. According to this phenomenon, after the input light L1 is deflected by Bragg angle $\theta$ by the transducer 3, it is introduced into the output grating coupler 28. The major part of the input light L1 is emitted from the waveguide 2 through the output grating coupler 28 as coupled light L2 at a coupling efficiency n3 and becomes the device output light. The remaining part of input light L1, however, is emitted from the right side endface (as shown in FIG. 3) of the thin film waveguide 2 as non-coupled light L3, and enters the photodiode array 14. The intensity and position of the coupled light L2 have correlative relationships with the intensity and position of the non-coupled light L3. Accordingly, if information on the intensity and position of the non-coupled light L3 can be obtained, this information is equivalent to obtaining information on the intensity and position of coupled light L2.

When the Bragg angle $\theta 3$ and diffraction efficiency n3 fluctuate to $\theta 4$ and n4, respectively, due to changes of the environmental temperature and the like, the intensity and position of the coupled light L2 and the non-coupled light L3 also fluctuate. The fluctuations of intensity and position of non-coupled light L3 are detected by the photodiode array 14, and the detected information is transmitted to processor controller 13. Data relating to the correlation between the intensity and position of the non-coupled light L3 and the intensity and the position of coupled light L2 are stored beforehand in the signal processor controller 13. Therefore, the amount of fluctuations of intensity and position of the coupled light L2 (device output light) can be determined by processing the aforesaid transmitted information. Control signals are transmitted to the laser diode driver 11 or RF driver 12 based on the amount of fluctuation. The drivers 11 and 12 correct the intensity of the laser light L1 emitted from the laser diode 10 and correct the output and oscillation frequency of the high frequency signal generated by the signal generator 4 based on the aforesaid control signals, so as to emit device output light of desired position and intensity.

Other Embodiments

The acousto-optic scanning device of the present invention is not limited to the previously described embodiments inasmuch as various modifications are possible and insofar as such modifications do not depart from the scope of the present invention.

Specifically, the non-coupled light detecting means may be a charge-coupled device (CCD). In addition, the signal generating means 4 may be an oscillating means other than a voltage control oscillator (VCO). Furthermore, the data relating to the correspondence between the intensity and position the of non-coupled light L3 and the intensity and position of the coupled light L2 need not be contained in a memory, and may be processed information which has been substituted in a control circuit such as an analog signal processor or the like and transmitted to a processing means.

As is shown in the description above, the present invention is capable of detecting fluctuations of position and intensity of non-coupled light arising from changes of environmental temperature and the like via an output light detecting means by providing a non-coupled light detecting means. Furthermore, if the intensity and position of coupled light detected by an output light coupling means has a correspondence to the intensity and position of non-coupled light and information relating to this intensity and position of non-coupled light can be obtained, such information is equivalent to obtaining information of the intensity and position of coupled light (device output light). Therefore, errors of the position and intensity of device output light can be determined from the fluctuation of position and intensity of non-coupled light detected by a non-coupled light detecting means, such that the position and intensity of the device output light can be corrected based on said detected error. Consequently, a compact, inexpensive, and high precision acousto-optic scanning device can be obtained which is capable of obtaining information concerning the position and intensity of device output light, and correcting errors of position and intensity using said information as feedback.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An acousto-optic scanning device comprising:
   a thin film waveguide of piezoelectric material;
   a transducer for generating surface elastic waves;
   high frequency signal generating means for generating high frequency signals to be applied to the transducer;
   a light source;
   light source driving means for driving the light source;
   input light coupling means for introducing light emitted from the light source into the thin film waveguide;
   output light coupling means for outputting light transmitted through the thin film waveguide therefrom;
   non-coupled light detecting means for detecting the position and intensity of light which is not coupled by the output light coupling means; and
   signal processing means for processing information detected by the non-coupled light detection means and generating control signals to correct the position and intensity of coupled light.

2. An acousto-optic scanning device according to claim 1, wherein said transducer includes an interdigital electrode.

3. An acousto-optic scanning device according to claim 1, wherein said high frequency signal generating means includes a voltage control oscillator.

4. An acousto-optic scanning device according to claim 1, wherein said light source includes a laser diode.

5. An acousto-optic scanning device according to claim 1, further comprising first control means for modifying light intensity by controlling the light source driving means based on control signals; and second control means for modifying signal output and oscillation frequency by controlling the high frequency signal generating means based on control signals, said control signals generated by said signal processing means.

6. An acousto-optic scanning device according to claim 1, wherein said input light coupling means includes a first prism coupler and said output light coupling means includes a second prism coupler, said first and second prism couplers maintaining a constant ratio between light introduced into the thin film waveguide and light which is not coupled by the output light coupling means.

7. An acousto-optic scanning device according to claim 1, wherein said input light coupling means includes a first grating coupler and said output light coupling means includes a second grating coupler, said first and second grating couplers.

8. An acousto-optic scanning device according to claim 1, wherein said non-coupled light detecting means includes a photodiode array arranged on an endface of said thin film waveguide.

9. An acousto-optic scanning device according to claim 1, wherein said signal processing means includes a signal processor controller which determines the amount of fluctuation of intensity and position of light output from said output light coupling means.

10. An acousto-optic scanning device comprising:
    a thin film waveguide of piezoelectric material;
    a transducer for generating surface elastic waves;
    high frequency signal generating means for generating high frequency signals to be applied to the transducer;
    a light source, light source driving means for driving the light source;
    input light coupling means for introducing light emitted from the light source into the thin film waveguide;
    output light coupling means for outputting light transmitted through the thin film waveguide therefrom, wherein the output light coupling means emits coupled light and non-coupled light;
    non-coupled light detecting means for detecting the position and intensity of non-coupled light emitted by the output light coupling means;
    signal processing means for generating control signals to correct the position and intensity of coupled light based on the detection result of the non-coupled light detecting means;
    first control means for modifying light intensity by controlling the light source driving means based on said control signals; and
    second control means for modifying signal output and oscillation frequency by controlling the high frequency signal generating means based on said control signals.

11. An acousto-optic scanning device according to claim 10, wherein said transducer includes an interdigital electrode.

12. An acousto-optic scanning device according to claim 10, wherein said high frequency signal generating means includes a voltage control oscillator.

13. An acousto-optic scanning device according to claim 10, wherein said light source includes a laser diode.

14. An acousto-optic scanning device according to claim 10, wherein said input light coupling means includes a first grating coupler and said output light coupling means includes a second grating coupler, said first and second grating couplers.

15. An acousto-optic scanning device according to claim 10, wherein said non-coupled light detecting means includes a photodiode array arranged on an endface of said thin film waveguide.

16. An acousto-optic scanning device according to claim 10, wherein said signal processing means includes a signal processor controller which determines the amount of fluctuation of intensity and position of light output from said output light coupling means.

17. An acousto-optic scanning device according to claim 10, wherein said first control means includes a signal line interconnecting said light source driving means and said signal processing means.

18. An acousto-optic scanning device according to claim 10, wherein said second control means includes a radio frequency driver.

19. An acousto-optic scanning device comprising:
    a thin film waveguide;
    a transducer for generating surface elastic waves;
    a light source;
    input light coupling means for introducing light emitted from the light source into the thin film waveguide;
    output light coupling means for outputting light transmitted through the thin film waveguide therefrom;
    non-coupled light detecting means for detecting the position and intensity of light which is not coupled by the output light coupling means; and
    signal processing means for processing information detected by the non-coupled light detection means and generating control signals to correct the position and intensity of coupled light.

20. An acousto-optic scanning device according to claim further comprising high frequency signal generating means generating high frequency signals to be applied to the transducer; and light source driving means for driving the light source.

* * * * *